(12) United States Patent
Neethling et al.

(10) Patent No.: US 9,591,147 B2
(45) Date of Patent: Mar. 7, 2017

(54) MANAGING OF CONSUMPTION TYPE SERVICE CONTRACTS

(71) Applicants: DIGITATA LIMITED, Port Louis (MU); Deon De Beer, Johannesburg (ZA)

(72) Inventors: Marthinus Phillipus Neethling, Randburg (ZA); Jacobus Johannes Pretorius Venter, Johannesburg (ZA)

(73) Assignee: DIGITATA LIMITED, Port Louis (MU)

( * ) Notice: Subject to any disclaimer, the term of this patent is extended or adjusted under 35 U.S.C. 154(b) by 0 days.

(21) Appl. No.: 14/427,988

(22) PCT Filed: Sep. 13, 2013

(86) PCT No.: PCT/IB2013/058542
§ 371 (c)(1),
(2) Date: Mar. 12, 2015

(87) PCT Pub. No.: WO2014/041521
PCT Pub. Date: Mar. 20, 2014

(65) Prior Publication Data
US 2015/0312424 A1 Oct. 29, 2015

(30) Foreign Application Priority Data

Sep. 13, 2012 (ZA) .................. 2012/04086

(51) Int. Cl.
*H04M 15/00* (2006.01)
*G06F 15/173* (2006.01)
*G06Q 30/02* (2012.01)

(52) U.S. Cl.
CPC .... *H04M 15/8033* (2013.01); *G06Q 30/0207* (2013.01); *H04M 15/8027* (2013.01); *H04M 15/8083* (2013.01)

(58) Field of Classification Search
CPC .. H04L 67/04; H04L 67/125; H04M 15/8027; H04M 15/8033; H04M 15/8083; G06Q 30/0207
USPC ............... 709/223, 203, 224; 455/406, 453; 370/390, 400; 705/37, 7.38
See application file for complete search history.

(56) References Cited

U.S. PATENT DOCUMENTS

| | | | | |
|---|---|---|---|---|
| 2002/0152086 A1* | 10/2002 | Smith | .................. | G06Q 50/188 705/80 |
| 2006/0015562 A1* | 1/2006 | Kilian-Kehr | ............ | H04L 67/04 709/206 |
| 2008/0141355 A1* | 6/2008 | Chevalier | ............ | H04L 63/104 726/7 |
| 2009/0043632 A1* | 2/2009 | Ricketts | .......... | G06Q 10/06314 705/7.21 |
| 2010/0172487 A1 | 7/2010 | Segall et al. | | |
| 2011/0112942 A1* | 5/2011 | Wolinsky | ........... | G06Q 30/0264 705/30 |
| 2011/0238462 A1* | 9/2011 | Sinha | ................. | G06Q 10/0637 705/7.36 |
| 2011/0263250 A1 | 10/2011 | Mueck et al. | | |
| 2011/0275344 A1 | 11/2011 | Momtahan et al. | | |
| 2012/0036440 A1 | 2/2012 | Dare et al. | | |
| 2012/0259876 A1* | 10/2012 | Mathai | .................. | G06Q 10/06 707/756 |
| 2012/0290427 A1* | 11/2012 | Reed | ...................... | G06Q 50/01 705/26.2 |
| 2013/0138617 A1* | 5/2013 | Pearson | ................. | G06Q 20/14 707/692 |
| 2013/0332199 A1* | 12/2013 | Freiwat | .................. | G06Q 40/08 705/4 |
| 2014/0109191 A1* | 4/2014 | Raghuram | .......... | H04L 67/1097 726/4 |
| 2014/0335900 A1* | 11/2014 | Farris | ...................... | H04W 4/02 455/456.3 |
| 2015/0222659 A1* | 8/2015 | Abou-Rizk | ......... | H04L 63/1466 726/26 |

FOREIGN PATENT DOCUMENTS

| WO | WO 2013/168094 | 11/2013 |
|---|---|---|
| WO | WO 2013/168095 | 11/2013 |

OTHER PUBLICATIONS

International Search Report and Written Opinion from International Application No. PCT/IB2013/058542 mailed Mar. 21, 2014.

* cited by examiner

*Primary Examiner* — Inder Mehra
(74) *Attorney, Agent, or Firm* — Dorsey & Whitney LLP

(57) ABSTRACT

The invention relates to a method for managing contracts for consumption type services which includes smoothing requests for enactment of UE contracts, by determining a time-to-live in respect of each UE contract, determining an estimate of the number of concurrent requests for contracts to occur at predetermined future time intervals, and modifying the actual issued time-to-live in respect of at least some of the enacted UE contracts to minimize network load. The method also extends to determining a trust-rating for at least some of the UE's contracted to a service provider for the consumption type service and modifying the trust-rating for such UE over time to more accurately reflect the actual trustworthiness of contract requests emanating from such UE.

11 Claims, No Drawings

MANAGING OF CONSUMPTION TYPE SERVICE CONTRACTS

FIELD OF THE INVENTION

This invention relates to a method of managing contracts for consumption type services, particularly a data communication service.

BACKGROUND TO THE INVENTION

Service providers in respect of consumption type services, such as data communication services, telephony, multimedia content consumption, and electricity supply services, typically provide their customers with a limited number of fixed contracts to elect from. These contracts are typically entered into for a fixed period, such as two years, and include a fixed service definition for the contract price. The contract is typically billed on a monthly basis and the cost of the contract is thus expressed as a monthly figure.

In some instances, contracts are also enacted for shorter periods, such as days. This extends particularly to pre-paid services.

Billing and rating functions for the above mentioned consumption type services are typically implemented as a core function of a service provider.

This approach introduces inflexibility in bringing new innovative products to the market and to consumers. The total cost of ownership of these solutions is typically very high, and these solutions typically have a high cost component attributed to their interdependencies on other nodes and solutions within the service provider's core systems. Rating across multiple service providers is also complicated and expensive.

Further, contracts for these types of services may be enacted at specific times, for example at midnight on the first day of a month or other billing cycle. The enactment of a number of contracts at the same time can place a load on the underlying systems and hardware, and may lead to degraded service quality especially if this involves a transaction between the Customer Communication Centre (providing an interface to the charging or billing system) and the User Equipment ("UE", see below). Each UE has a so-called time-to-live in respect of the enactment of a new contract relating to its service consumption. Where a large number of UE's have the same time-to-live an expected spike in demand on the system may occur that places an increased load on the service network. This is especially prevalent with mobile communication services.

A further aspect of consumption type service contracts is that incentives are provided in the form of discounted service rates. These incentives are decided upon by the service provider and depend, amongst other factors, on demand for the service. For example, with mobile communication devices, a service provider may offer discounted call or data rates in a specific area or at a specific time. The aim of this is to incentivise consumers to make use of the service in such an area or at such a time, rather than in other areas or at other times when demand is higher. The benefit for the service provider is that network load is reduced for peak demand areas or times. For the consumer the benefit is paying less for the same consumption of service. If a consumer is not willing to consume the service at a different time or in a different place, he is not penalised, but simply pays the contracted rate.

A risk with offering such discounts is that it is possible for a consumer to provide, through his UE, false data to a service provider, for example in respect of its actual location or time data, in order to receive a discount for which he does not qualify.

A consumer may obtain, for example from the Internet, a listing of geographic locations or time slots within which discounted call or data rates apply. It may then be possible for the consumer to hack into the operating system of his UE to provide fraudulent location data to the service provider making it appear that the UE is actually within a discounted geographic location. The consumer is thus charged at discounted rates for consuming services in a non-discounted geographic location. Apart from being fraudulent, this behaviour also defeats the purpose of the discount system which is to incentivise consumers to use services in low demand geographic locations or in low demand time periods.

It is not only location data that may be fraudulently submitted in this manner. It is for example also possible to submit incorrect time data to the service provider, which in conjunction with incorrect location data effectively places the consumer, as far as billing of service consumption is concerned, in a different time and place.

It is possible for the network to determine the actual location data and local time of a UE, but this consumes network capacity and has a cost implication, and practically cannot be done for all UE all of the time.

In this specification the phrase "user equipment" or "UE" refers to a hardware device that a user uses to exploit the services offered by a service provider, for example a mobile telephone or a communication enabled laptop or tablet, or machine-to-machine ("M2M") type devices such as fridges, home automation systems, and sensors.

In this specification the phrase "charging system" refers to the Real Time Charging Platform used by a service provider to handle the billing of consumed services in respect of its customers.

In this specification the term "enacting" means the act of contracting between a service provider and a UE for the provision of services by the service provider and use thereof by the UE, at agreed terms with respect to, amongst others, cost and duration, to enable the UE to consume services from such service provider in terms of the specific contract.

In this specification the term "enforcing" means the selection of a contract for use by a UE at any time, so that specific services from the service provider consumed by the UE is rated and billed in terms of that specific contract by the UE.

In this specification the term "time to live" means the period during which the service contract is valid, typically measured from when the contract is enforced (i.e. is issued by the service provider's charging system and accepted by the consumer).

OBJECT OF THE INVENTION

It is an object of the invention to provide a method of managing contracts for consumption type services which at least partly overcomes the abovementioned problems.

SUMMARY OF THE INVENTION

In accordance with this invention there is provided a method of managing contracts for consumption type services which includes smoothing requests for enactment of UE contracts, by determining a time-to-live in respect of each UE contract, determining an estimate of the number of concurrent requests for contracts to occur at predetermined future time intervals, and modifying the actual issued time-to-live in respect of at least some of the enacted UE contracts to minimize network load.

There is further provided for the increase in time-to-live period to be performed up to a predetermined threshold.

There is further provided for the method to include assigning a trust-rating to each UE, and to modify the trust-rating over time to more accurately reflect the actual trustworthiness of contract requests emanating from the UE.

There is further provided for the method to include conducting verification of a UE trust-rating by verifying data received from the UE that relates to its trust-rating and for the verification to be done more frequently for a UE with a lower trust-rating and less frequently for a UE with a higher trust-rating.

There is further provided for the method to include conducting verification less frequently for a UE the longer it remains a consumer of the consumption type service with a specific service provider thereof.

There is further provided for a higher frequency of trust verifications for UE's that are found to be associated with other UE's that have been determined to have a trust-rating below a predetermined value, alternatively to be untrustworthy.

There is further provided for the method to include utilising the geographic location of the UE as a factor in determining the trust-rating of the UE, by determining a geographic area within which the UE most frequently operates and assigning a higher trust-rating to contracts requests emanating from the UE whilst in that geographic area, compared to contract requests emanating from the UE whilst outside that geographic area.

There is further provided for the method to include determining at least one geographic area, and preferably a plurality of geographic areas, within which the UE operates, determining the frequency of its use in each of these areas and factoring such frequency in the trust-rating of the UE in respect of requests emanating from the UE in each of these areas.

There is further provided for the geographic location of a UE which is unknown to the service provider to be verified until the service provider determines that the UE has achieved a predeterminable minimum trust-rating in respect of the specific geographic location or generally.

There is further provided for a UE that has achieved a predeterminable minimum trust-rating to be determined to be a trusted UE, and for the geographic location of a trusted UE to be verified periodically and optionally also for the geographic location to be verified if the geographic location of the UE has changed since its previous contract request.

There is still further provided for a failed geographic location verification to result in a UE being deemed untrusted and for its location to be verified for at least a predetermined period of time or for a predetermined number of contract requests until the trust-rating of the UE has been established again to a predetermined level.

There is further provided for the frequency of geographic location verifications to be increased for all UE's when capacity to perform these verifications is available and conversely for the frequency to be reduced as capacity declines.

There is further provided for the method to include conducting a greater number of geographic location verifications in respect of fraudulent contract request sent by a UE or in respect of contract requests received from a UE in a geographic location which provides a greater discount in respect of contract costs.

There is further provided for the probability of a geographic verification to be increased in the case of two successive locations implying a high speed of movement between them.

There is further provided for an increase in the frequency of geographic location verifications if there is an unexpectedly large increase in the number of UE's claiming to be in a particular geographic area, or if the network load in a particular area increases unexpectedly.

There is further provided for an increase in the frequency of geographic location verifications if on later examination there proves to be a mismatch between the UE's reported position and locations determined by other systems.

According to a further feature of the invention, the method includes utilising the trust-rating of a UE as a factor to determine whether to enact a contract that provides the consumption service at a discount to the UE.

These and other features of the invention are described in more detail below.

DESCRIPTION OF THE INVENTION

Smoothing of Requests

The Time-To-Live (TTL) associated with a planned discount of a consumption type service is used as a reference point for the smoothing operation. It can be assumed that the client will query the Customer Communication Centre (CCC) server once the TTL has expired to obtain a new discount/offer and TTL value.

Since the TTL for all issued discounts are known, the system can estimate the number of concurrent requests that will occur in future. In order to minimise network load, the actual issued TTL value is increased up to a predefined threshold so that the future request does not coincide with too many other requests.

This is accomplished by the definition of a number of buckets that covers some length of time, dependant on the defined granularity and the duration of the longest TTL present in the system. The smoothing algorithm will ensure that the number of expiring discounts over the buckets always remain constant, in this way balancing the processing load.

Consequently, the resulting sliding window will deterministically issue discounts in such a way to minimise impact on supporting systems.

Trust-Rating of UE

In order to minimise the number of geographic location requests handled by a Signalling GateWay each UE device is assigned a trust-rating which is built up over a period of time. This allows location checking to be biased towards higher risk UE's and conditions and minimised for low risk situations. The geographic location is typically provided by the UE to the service provider, but it may also be determined from other sources such as from the mobile Network.

An unknown device's location is always verified until the device has proven itself to be trustworthy in terms of the provided location. A trusted device's location is still checked periodically to ensure trustworthiness. There is also a higher probability of a spot check if the location has changed since the previous request.

If verification should fail, the device will be considered untrusted and its location will be verified in future requests. Fraudulent locations sent by devices as well as locations advertising large discounts will also have a greater probability to be verified for periodic spot checks on trusted devices. This will lessen the load on the SGW while not compromising the integrity of the system.

Without derogating form the above, the methodology of determining and using the trust-rating of a UE and the frequency of conducting verifications are also changed according to the following factors:

verification is done more frequently for a UE with a lower trust-rating and less frequently for a UE with a higher trust-rating;

verification is done less frequently for a UE the longer it remains a consumer of the consumption type service with a specific service provider thereof;

there is a higher frequency of trust verifications for UE's that are found to be associated with other UE's that have been determined to have a trust-rating below a predetermined value, alternatively found to be untrustworthy;

the trust-rating determination includes utilising the geographic location of the UE as a factor in determining the trust-rating of the UE, by determining a geographic area within which the UE most frequently operates and assigning a higher trust-rating to contracts requests emanating from the UE whilst in that geographic area, compared to contract requests emanating from the UE whilst outside that geographic area;

the trust-rating determination includes determining at least one geographic area, and preferably a plurality of geographic areas, within which the UE operates, determining the frequency of its use in each of these areas and factoring such frequency in the trust-rating of the UE in respect of requests emanating from the UE in each of these areas;

the geographic location of a UE which is unknown to the service provider is verified until the service provider determines that the UE has achieved a predeterminable minimum trust-rating in respect of the specific geographic location or generally;

an UE that has achieved a predeterminable minimum trust-rating is determined to be a trusted UE, and the geographic location of a trusted UE is verified periodically and optionally also its geographic location is verified if its geographic location has changed since its previous contract request;

a failed geographic location verification results in a UE being deemed untrusted and for its location to be verified for at least a predetermined period of time or for a predetermined number of contract requests until the trust-rating of the UE has been established again to a predetermined level;

the frequency of geographic location verifications is increased for all UE's when capacity to perform these verifications is available and conversely for the frequency to be reduced as capacity declines;

the trust-rating determination includes conducting a greater number of geographic location verifications in respect of fraudulent contract request sent by a UE or in respect of contract requests received from a UE in a geographic location which provides a greater discount in respect of contract costs;

the probability of a geographic verification is increased in the case of two successive locations implying a high speed of movement between them;

the trust-rating determination includes an increase in the frequency of geographic location verifications if there is an unexpectedly large increase in the number of UE's claiming to be in a particular geographic area, or if the network load in a particular area increases unexpectedly; and the trust-rating determination includes an increase in the frequency of geographic location verifications if on later examination there proves to be a mismatch between the UE's reported position and locations determined by other systems.

If a UE is determined to be an untrusted UE, the service provider can use such determination as a factor when deciding whether to enact a contract with the UE that provides it with the consumption service at a discount.

It will be appreciated that the above embodiments are given by way of example only and are not intended to limit the scope of the invention. Amendments of the embodiments are possible within the scope of the invention.

The invention claimed is:

1. A method of managing contracts for a consumption type service which includes smoothing requests for enactment of user equipment ("UE") contracts, the method comprising:

determining a time-to-live in respect of each UE contract;

determining an estimate of a number of concurrent requests for contracts to occur at predetermined future time intervals;

modifying the actual issued time-to-live in respect of at least some of the enacted UE contracts to minimize network load;

determining a trust-rating for at least some of the UE's contracted to a service provider for the consumption type service;

modifying the trust-rating for such UE over time to more accurately reflect the actual trustworthiness of contract requests emanating from such UE;

conducting verification of a UE trust-rating by verifying data received from the UE that relates to its trust-rating, conducting the verification done more frequently for a UE with a lower trust-rating and less frequently for a UE with a higher trust-rating; and conducting the verification less frequently for a UE the longer it remains contracted to the specific service provider.

2. The method as claimed in claim 1 in which the verification is conducted at a higher frequency for a UE that is determined to be associated with other UE's that have been determined to have a trust-rating below a predetermined value.

3. The method as claimed in claim 1, further comprising:

determining at least one geographic area within which a UE operates; and determining the frequency of its use in the area and factoring such frequency in the trust-rating of the UE in respect of requests emanating from the UE in the area.

4. The method as claimed in claim 1, further comprising:

utilising the geographic location of a UE as a factor in determining the trust-rating of such UE, by determining a geographic area within which such UE most frequently operates; and assigning a higher trust-rating to contract requests emanating from such UE whilst in that geographic area, compared to contract requests emanating from such UE whilst outside that geographic area.

5. The method as claimed in claim 1, further comprising verifying the geographic location of an untrusted UE for at least a predetermined period of time or for a predetermined number of contract requests until the UE that has achieved a predeterminable minimum trust-rating equal to that of a trusted UE again.

6. The method as claimed in claim 1 in which the frequency of geographic location verifications is increased for all UE's when the service provider has capacity to perform such verifications and the frequency of geographic location verifications is reduced when capacity to perform such verifications declines.

7. The method as claimed in claim 1, further comprising increasing the probability of conducting geographic verification in respect of a UE if a determination of the speed of movement of a UE indicates a speed in excess of a minimum threshold.

8. The method as claimed in claim 7 in which the geographic locations and time stamps of two successive geographic locations returned by the UE are compared to determine the distance between the two successive geographic locations and the time that elapsed between the UE returning the two geographic locations and the data is used to calculate the speed of movement of the UE between the two geographic locations.

9. The method as claimed in claim 1, further comprising an increase in the frequency of geographic location verifications if there is an unexpectedly large increase in the number of UE's returning a geographic location within a specific geographic area, or if the network load in a specific geographic area increases unexpectedly.

10. The method as claimed in claim 1, further comprising an increase in the frequency of geographic location verifications for a UE if later examination indicates a mismatch between a UE's reported geographic location and locations determined by other independent systems or means.

11. The method as claimed in claim 1, further comprising utilising the trust-rating of a UE as a factor to determine whether to enact a contract that provides the consumption service at a discount to the UE.

\* \* \* \* \*